(12) United States Patent
Nakamura

(10) Patent No.: US 7,223,499 B2
(45) Date of Patent: May 29, 2007

(54) LEAD BATTERY

(75) Inventor: Toshimichi Nakamura, Nagaokakyo (JP)

(73) Assignee: GS Yuasa Corporation, Kyoto (JP)

( * ) Notice: Subject to any disclaimer, the term of this patent is extended or adjusted under 35 U.S.C. 154(b) by 285 days.

(21) Appl. No.: 10/494,091

(22) PCT Filed: Nov. 5, 2002

(86) PCT No.: PCT/JP02/11501

§ 371 (c)(1),
(2), (4) Date: Apr. 30, 2004

(87) PCT Pub. No.: WO03/041195

PCT Pub. Date: May 15, 2003

(65) Prior Publication Data

US 2005/0037264 A1   Feb. 17, 2005

(30) Foreign Application Priority Data

Nov. 6, 2001   (JP)   ............................. 2001-341179

(51) Int. Cl.
*H01M 4/68* (2006.01)
*H01M 4/74* (2006.01)

(52) U.S. Cl. ...................................... 429/245; 429/242

(58) Field of Classification Search ................ 429/241, 429/242, 245
See application file for complete search history.

(56) References Cited

U.S. PATENT DOCUMENTS

| 3,862,861 A | 1/1975 | McClelland et al. ........... 136/26 |
| 4,107,407 A * | 8/1978 | Koch .......................... 429/225 |
| 5,120,620 A | 6/1992 | Nelson et al. ............... 429/225 |

FOREIGN PATENT DOCUMENTS

| JP | 63-086352 A | 4/1988 |
| JP | 2-12385 B2 | 3/1990 |
| JP | 5-51147 B2 | 7/1993 |

* cited by examiner

*Primary Examiner*—Patrick Joseph Ryan
*Assistant Examiner*—Thomas H. Parsons
(74) *Attorney, Agent, or Firm*—Wenderoth, Lind & Ponack, L.L.P.

(57) ABSTRACT

A grid is obtained by punching or expanding a sheet comprising a pure lead (Pb: 99.99 mass % or more) plate having a lead-tin alloy layer formed at least on one side of the pure lead plate. By using it as a positive electrode of a lead-acid battery, the problem that a pure lead grid shows bad charge acceptance characteristics after deep discharge can be solved, maintaining the excellent trickle life performance which a pure lead grid shows originally.

8 Claims, 4 Drawing Sheets

US 7,223,499 B2

LEAD BATTERY

TECHNICAL FIELD

The present invention relates to a lead-acid battery.

BACKGROUND ART

The use of a lead-acid battery is classified into trickle use (float use) in which the battery usually charges on fixed voltage and discharges as needed and cycle use in which the battery charges and discharges repeatedly. The main cause of deterioration of the lead-acid battery in the former trickle use is the corrosion of a positive-electrode grid. This is because the alloy of the grain boundary used for a grid material is selectively corroded during charge.

Using the grid into which the pure lead sheet was processed was proposed by U.S. Pat. No. 3,862,861.

Since the grain boundary of pure lead is not clear, the above-mentioned problem due to the grain boundary does not occur and an excellent trickle life performance can be obtained. However, when pure lead is used for a grid, in cycle use, it has a defect in that the capacity does not recover even if it charges, especially when deep discharge occurs.

As this provision, the method of making a lead-tin alloy instead of a pure lead into the shape of a sheet with rolling, and using the grid obtained by punching-processing or expanded processing was proposed by U.S. Pat. No. 5,120,620. Although the charge acceptance characteristics after deep charge can be improved by this method, since the metal used for said grid is a lead-tin alloy, a grain boundary exists, the corrosion of a positive-electrode grid advances in a trickle life, and there is a problem which is a short life compared with a pure lead grid.

DISCLOSURE OF INVENTION

A feature of this invention is that in a lead-acid battery which uses a grid which was manufactured by punching or expanding a rolled pure lead sheet, the pure lead sheet having a lead-tin alloy layer formed at least on one side of it is used for a positive electrode. By providing a layer containing Sn in the interface between the grid and a positive active material, this invention solves the problem of inferior charge recovery characteristics in the pure lead grid after deep discharge, and provides a lead-acid battery maintaining the excellent trickle life performance which the pure lead shows originally.

DESCRIPTION OF THE PREFERRED EMBODIMENTS

Figure 1:
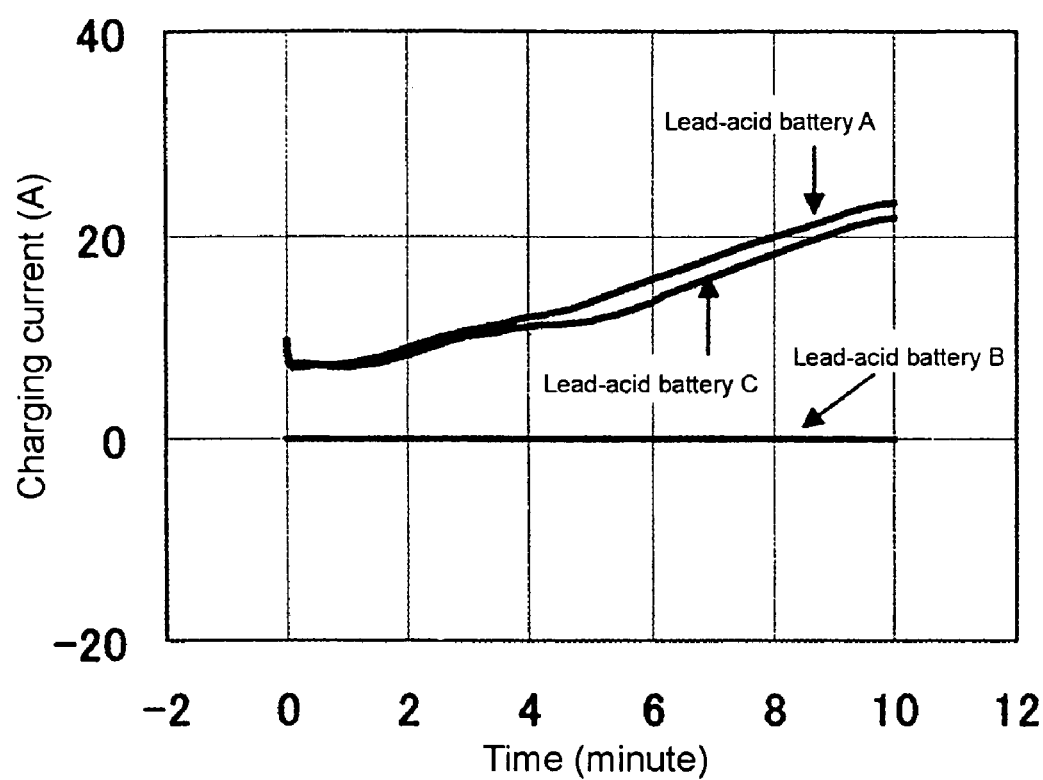
FIG. 1 is a graph showing the change of charging current during charging under a charging acceptance characteristics test after deep discharge.

This invention is explained in detail based on an example below. This example describes a cylindrical valve-regulated lead-acid battery with a wound spirally positive and negative electrode and separator, which was inserted into a cylindrical container using the soft property of a pure lead sheet In the valve-regulated lead-acid battery, the minimum quantity of electrolyte required for discharging is maintained on a glass separator by making the best use of excellent liquid maintainability with an absorptive glass mat separator (referred to as a glass separator) inserted into the section between the positive and negative electrodes as a separator.

As described above, by putting the making an electrolyte in starve condition, oxygen gas generated during charge can be easily penetrated and transferred to be reduced and absorbed on the negative electrode, eventually resulting in the acquirement of excellent characteristics in the oxygen cycle. More specifically, it is provided with functions as a maintenance-free lead-acid battery by repression of reduction in electrolyte due to the oxygen cycle.

Moreover, the lead-acid battery according to the invention contains a feature as a non-spillable battery in which the electrolyte would not leak even if the lead-acid battery falls, since the electrolyte is kept in the starve condition. This has been used in many fields recently.

Examples of the invention are hereinafter described with reference to the accompanying drawings.

(EXAMPLE OF INVENTION)

By combining a lead-10 mass % Sn alloy plate, the thickness of which is 0.4 mm, with a pure lead (99.99%) plate, the thickness of which is 10 mm, and rolling them, a combined sheet with a thickness of 0.6 mm was manufactured. By punching this sheet, a grid with 5 mm×7 mm spaces for pasting was manufactured.

By applying a paste which is made by adding the dilute sulfuric acid to mixed powder of t-PbO, $Pb_3O_4$, and metallic Pb, to the above-mentioned grid, a positive-electrode was manufactured.

By applying the paste, which is made by adding the dilute sulfuric acid to mixed powder of t-PbO and metallic Pb, to a grid which comprises a pure lead (lead: 99.99 mass %) sheet, the negative-electrode was manufactured.

The plate thickness of both the positive and negative-electrode plates is set to 0.9 mm.

These positive- and negative-electrode, and glass separators were combined, and the high pressure force (about 100 kPa) was applied to wind them spirally, and make an element (referred to as a configuration element which consists of combined positive- and negative-electrode plates, and a separator). This element was inserted into a cylindrical container with a diameter of 49 mm and a height of 100 mm, and a cylindrical valve-regulated lead-acid battery which has 10 Ah discharge capacity (rated capacity) at 5 hr rate was made.

In addition, an object which is mainly composed of glass fibers with an average diameter of about 1 micrometer and into which 20 mass % of silica was mixed was used as a separator by being pressed under 20 kPa load into 0.8 mm thickness from about 0.9 mm thickness and about 91% porosity.

After filling a container with about 115 g of electrolyte, which is a solution to dissolving 25 g/l sodium sulfate into a dilute sulfuric acid and with a specific gravity of 1.24 (at 20° C.), container formation was carried out. The container formation described herein indicates a formation under the condition where an unformed element is inserted into a container and electrolyte is poured in.

The battery manufactured by the above configuration and the method is designated A.

In order to demonstrate the excellent property in the lead-acid battery A of one example of this invention, a comparison test with conventional products was performed. The battery used for the comparison test in that case is shown concretely.

(COMPARISON EXAMPLE)

A grid manufactured by the same method as above was used for a positive-electrode, made from a sheet with a thickness of 0.6 mm by rolling processing of the pure lead (Pb: 99.99 mass %) plate, and a lead-acid battery B, as well as the aforementioned lead-acid battery A, was manufactured for other configurations.

(COMPARISON EXAMPLE)

A grid manufactured by the same method as above was used for a positive-electrode, made from a sheet with a thickness of 0.6 mm by rolling processing of the 99.0 mass % lead-1.0 mass % tin alloy plate, and a lead-acid battery C, as well as the aforementioned lead-acid battery A, was manufactured for other configurations.

A comparative study of the charge acceptance characteristics after deep discharge and the trickle life performance was performed for the three kinds of above-mentioned batteries. Those results are shown below.

The Charge Acceptance Characteristics after Deep Discharge

Test Condition

After discharging the above-mentioned battery to final voltage 1.7V with a current of 2 A, moreover, 100 ohm resistance was connected for 14 days, and the battery was put into a deep discharge condition. Then, after leaving the battery whose resistance was removed under 0° C. environment for 16 hours, a constant voltage charge of 2.4V (limit current 50 A) was performed for 10 minutes, and a change of the charging current at this time was observed.

Test Result

A test result is shown in FIG. 1.

In the lead-acid battery B using pure lead, the charging current was kept OA during the charge for 10 minutes, and it was hardly charged, so the charge acceptance characteristics was bad. On the other hand, in the lead-acid battery A according to the invention and the lead-acid battery C using only a lead-tin alloy, the charging current flowed and their charge acceptance characteristics were good.

As a result of the test, it was found that presence of tin in the positive-electrode grid is effective to improve the charge characteristics after deep discharge. Especially, although the positive-electrode grid of the lead-acid battery A according to the invention has little tin content compared with that of the lead-acid battery C, since tin intensively exists in the portion in contact with positive active material, it can be said that existence of the tin acted more effectively.

Trickle (Float) Life Test

Test Condition

The above-mentioned battery was constantly at a trickle-charge voltage of 2.275V in the gaseous phase with an environmental temperature of 60° C. It was taken out every month, and the capacity test was performed at a discharge current of 10 A (final voltage 1.0V).

Test Results

Figure 2:
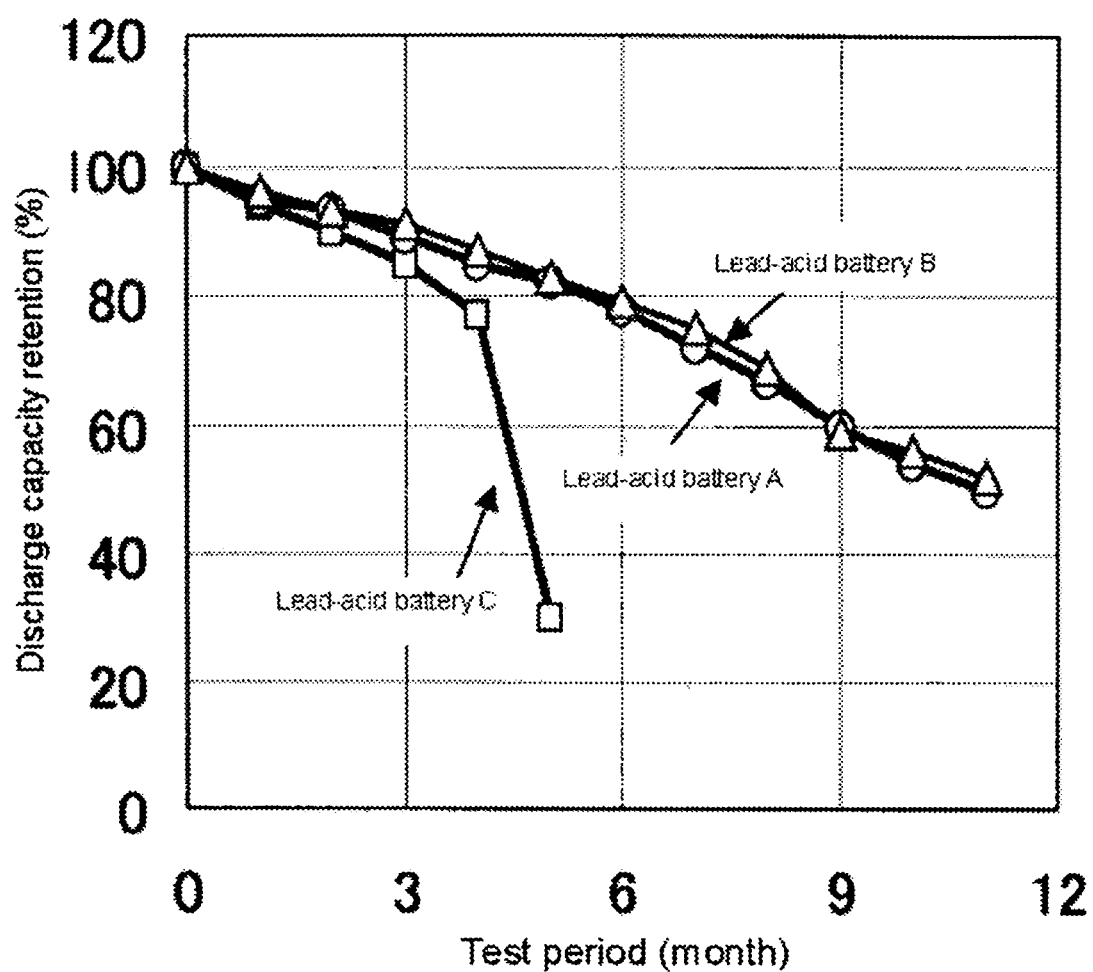
FIG. 2 is a graph showing a change in discharge capacity retention under a trickle (float) life test.

The test results are shown in FIG. 2.

Although the capacity in the lead-acid battery C was less than 50% of initial capacity after 5 months, 50% or more of initial capacity was maintained even after 10 months in the lead-acid battery A and the lead-acid battery B using pure lead.

Although grain boundary corrosion which is a feature of an alloy grid, was advancing considerably in the Lead-acid battery C when the battery was disassembled after the test and the positive-electrode was investigated, little grain boundary corrosion of the grid was observed in the Lead-acid battery A and Lead-acid battery B.

As shown in these test results, since the positive-electrode grid of the Lead-acid battery A comprises a combined sheet which was created by combining a pure lead (Pb: 99.99 mass %) plate with the lead-10 mass % tin alloy plate and rolling them, unlike a grid which was created by rolling only a lead-tin alloy, tin exists intensively on a surface section with which an active material comes in contact, and much pure lead exists in other sections, it is assumed that an effect of the pure lead on the trickle life was obtained.

Lead-Acid Batteries D-1 to K-5

In the configuration of the Lead-acid battery A, an appropriate range of thickness of the lead-tin alloy layer, which is combined with the pure lead sheet, and the content of the tin is described in the test results.

Effect of Lead-Tin Alloy Layer Thickness and Tin Content on Performance of Lead-Acid Battery Test Condition In order to investigate the effect of the ratio of the lead-tin alloy layer thickness to the total thickness of the combined sheet and the content of tin per weight of the combined sheet, by rolling lead-tin alloy plates which contain 0.3 mass %, 0.5 mass %, 1 mass %, 10 mass %, 20 mass %, 25 mass %, 30 mass %, 40 mass %, 45 mass %, and 50 mass % as tin content, sheet materials (0.03 mm, 0.05 mm, 0.11 mm, 0.42 mm, 2.5 mm, 4.3 mm, 6.7 mm, and 8.2 mm in thickness,) were manufactured. Moreover, by combining the lead-tin alloy sheet material with a pure lead (Pb: 99.99 mass %) plate the thickness of which is 10 mm and continuing to roll them until the thickness reaches 0.6 mm, combined sheets comprising pure lead alloy plate and lead-tin alloy plate were manufactured.

Next, the sheets were punched to manufacture positive-electrode grids having 5 mm×7 mm space for pasting. These were used as positive electrodes to manufacture 29 kinds of lead-acid batteries (lead-acid batteries D-1 to K-5). In these batteries, the same configuration as that of the lead-acid battery A was applied to those of these lead-acid batteries except for that of the positive-electrode grid.

X(%) and Y(%) are shown in Table 1 for the positive-electrode grid used for the lead-acid batteries D-1 to K-5, wherein X(%) is a ratio of the lead-tin alloy layer thickness to a total sheet thickness and Y(%) is a ratio of Sn content to the lead-tin alloy layer mass.

TABLE 1

| Kind of lead-acid battery | Thickness ratio of alloy layer X(%) | Sn content of alloy layer Y(mass %) |
|---|---|---|
| D-1 | 0.3 | 0.5 |
| D-2 | 0.3 | 10 |
| D-3 | 0.3 | 50 |
| E-1 | 0.5 | 0.3 |
| E-2 | 0.5 | 0.5 |
| E-3 | 0.5 | 10 |
| E-4 | 0.5 | 45 |
| E-5 | 0.5 | 50 |
| F | 1 | 10 |
| G-1 | 4 | 0.3 |
| G-2 | 4 | 0.5 |
| G-3 | 4 | 1 |
| G-4 | 4 | 10 |
| G-5 | 4 | 20 |
| G-6 | 4 | 40 |
| G-7 | 4 | 45 |
| G-8 | 4 | 50 |
| H | 20 | 10 |
| I-1 | 30 | 0.5 |
| I-2 | 30 | 10 |
| I-3 | 30 | 20 |
| I-4 | 30 | 30 |
| I-5 | 30 | 40 |
| J | 40 | 10 |
| K-1 | 45 | 0.3 |
| K-2 | 45 | 0.5 |
| K-3 | 45 | 10 |
| K-4 | 45 | 25 |
| K-5 | 45 | 40 |

These 29 kinds of lead-acid batteries underwent a charge acceptance characteristics test after deep discharge and a trickle life test. The above-mentioned tests were conducted under the same conditions for the comparison test for the afore-mentioned lead-acid batteries.

The test results are shown hereinafter.

TABLE 2

| Kind of lead-acid battery | Test results of charge acceptance characteristics after deep discharge | Test results of trickle life performance |
|---|---|---|
| D-1 | x | o |
| D-2 | x | o |
| D-3 | x | o |
| E-1 | x | o |
| E-2 | o | o |
| E-3 | o | o |
| E-4 | o | o |
| E-5 | o | x |
| F | o | o |
| G-1 | x | o |
| G-2 | o | o |
| G-3 | o | o |
| G-4 | o | o |
| G-5 | o | o |
| G-6 | o | o |
| G-7 | o | o |
| G-8 | o | x |
| H | o | o |
| I-1 | o | o |
| I-2 | o | o |
| I-3 | o | o |
| I-4 | o | o |
| I-5 | o | x |

TABLE 2-continued

| Kind of lead-acid battery | Test results of charge acceptance characteristics after deep discharge | Test results of trickle life performance |
|---|---|---|
| J | o | o |
| K-1 | o | x |
| K-2 | o | x |
| K-3 | o | x |
| K-4 | o | x |
| K-5 | o | x |

In table 2, the test results of the charge acceptance characteristics test after deep discharge and the trickle life performance test were evaluated in accordance with the following criteria. As a result, the case where the charging current was not 0 A from the test start to the end (that is, charge can be accepted) was judged to be "good".

Figure 3:
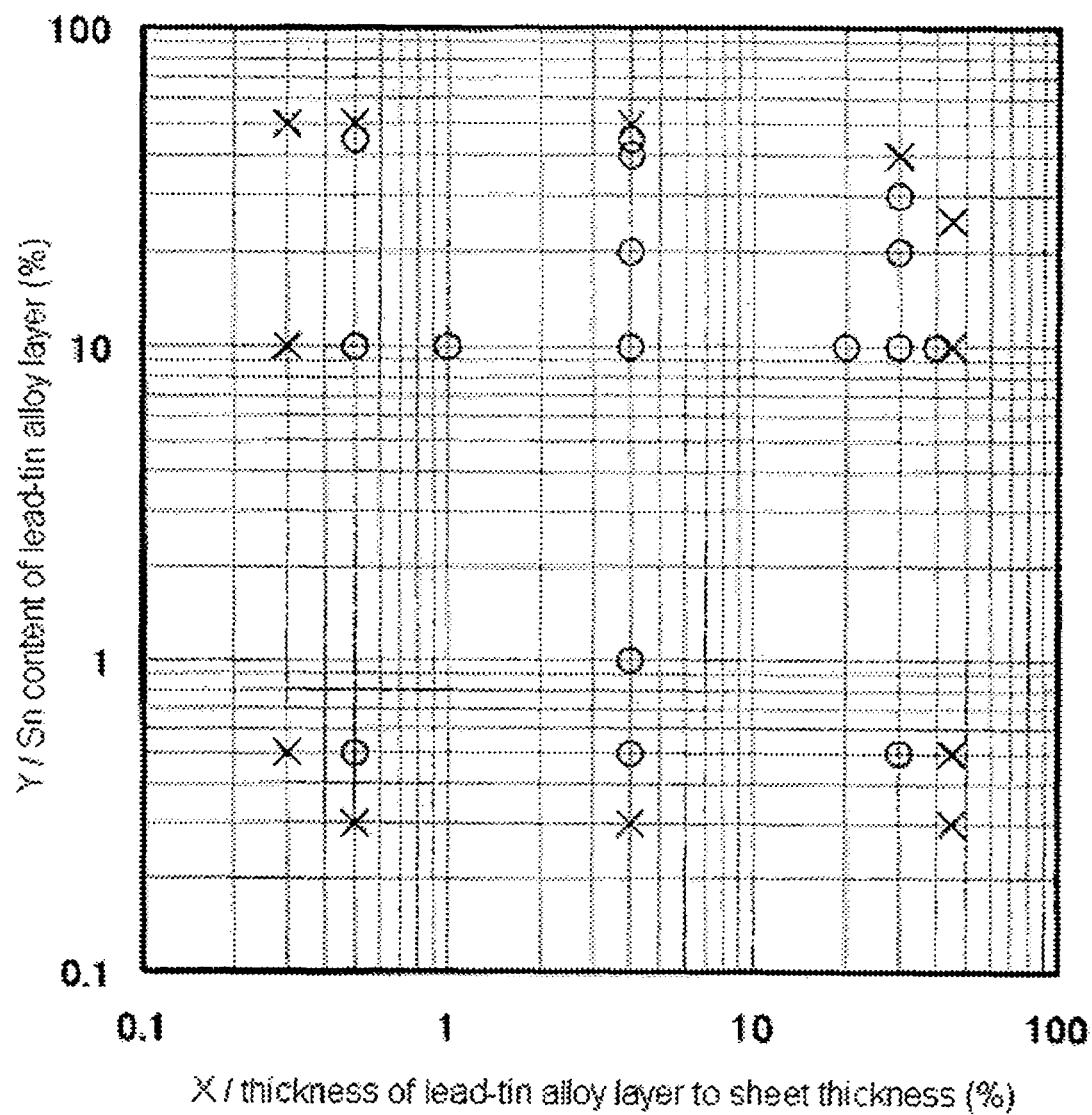
FIG. 3 is a graph showing a desirable range of the thickness ratio of the lead-tin alloy layer to the total thickness of the unified sheet, and the relation between the tin content (mass %) of a lead-tin alloy layer.

(Test results of charge acceptance characteristics after deep discharge)
=>o: where charge acceptance characteristics are in good condition
=>x: where charge acceptance characteristics are not in good condition (Test results of trickle life performance)
=>o: where discharge capacity after 10 months is more than 50% of the initial capacity
=>x: where discharge capacity after 10 months is less than 50% of the initial capacity Next, in FIG. 3 where the above-mentioned "X" values are indicated along the X axis and "Y" values are indicated along the Y axis, the "o" mark was made for the test results where both the charge acceptance characteristics test and the trickle life test are acceptable and the "X" mark was when on the test results of either result of the above-mentioned tests are unacceptable.

It was found that the lead-acid batteries which are located on the range of $0.5 \leq X \leq 40$ and $0.5 \leq Y \leq -0.625X+50$ have an excellent trickle life performance and favorable charge acceptance characteristics after deep discharge.

Moreover, the above-mentioned trickle life performance test results were reevaluated on the following criteria.
=>o: where the discharge capacity after 10 months under the trickle performance test is more than 70% of the initial capacity
=>x: where the discharge capacity after 10 months under the trickle performance test is less than 70% of the initial capacity The above-mentioned results are shown in Table 3.

TABLE 3

| Kind of lead-acid batteries | Test results of trickle life performance |
|---|---|
| D-1 | o |
| D-2 | o |
| D-3 | x |
| E-1 | o |
| E-2 | o |
| E-3 | o |
| E-4 | o |
| E-5 | x |
| F | o |
| G-1 | o |
| G-2 | o |
| G-3 | o |
| G-4 | o |
| G-5 | o |
| G-6 | o |

TABLE 3-continued

| Kind of lead-acid batteries | Test results of trickle life performance |
|---|---|
| G-7 | o |
| G-8 | x |
| H | o |
| I-1 | o |
| I-2 | o |
| I-3 | o |
| I-4 | o |
| I-5 | x |
| J | x |
| K-1 | x |
| K-2 | x |
| K-3 | x |
| K-4 | x |
| K-5 | x |

Figure 4:
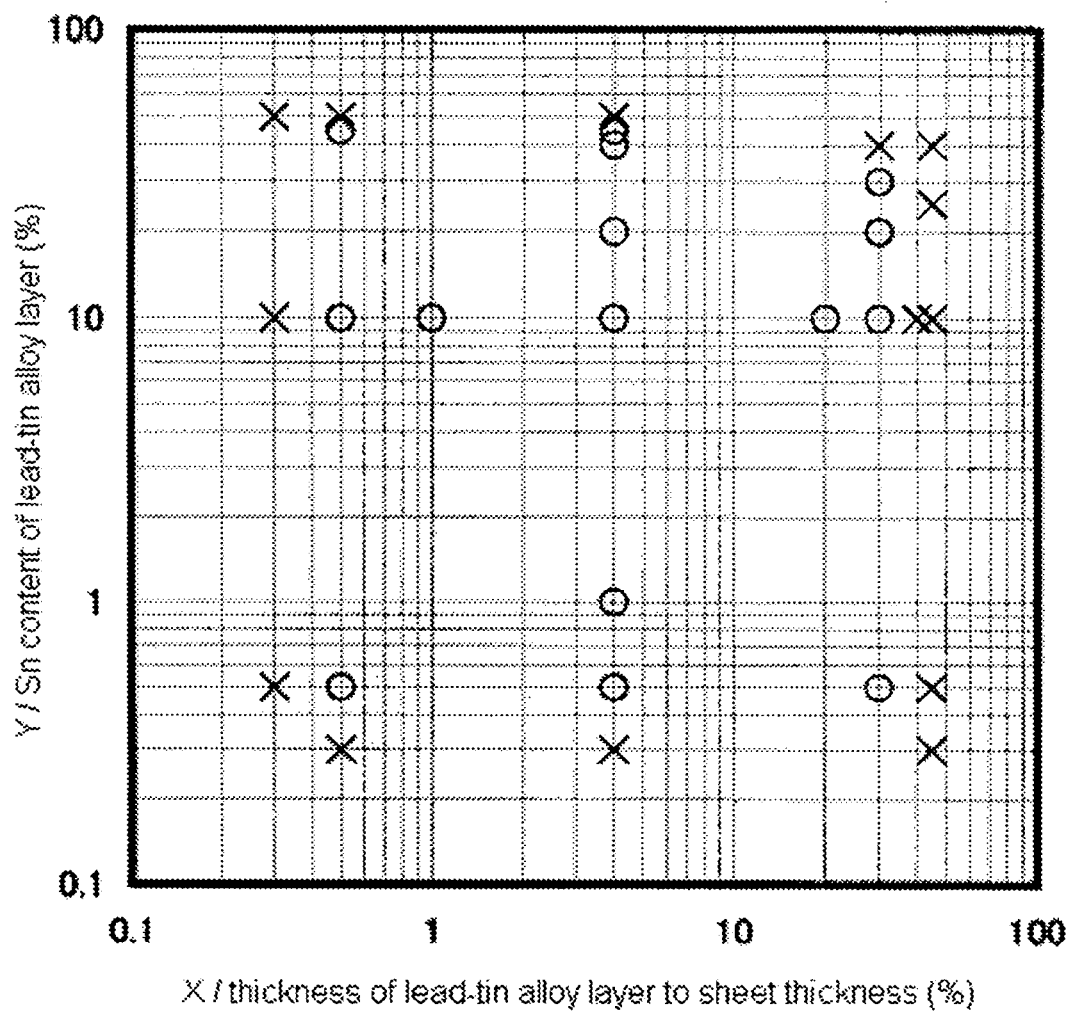
FIG. 4 is a graph showing the results in which the performance of a storage battery was reevaluated.

Based on the above-mentioned reevaluated test results, the "o" mark was made on the test results where both the charge acceptance characteristics test and the trickle life test are acceptable and the "x" mark was made on the test results where either result of the above-mentioned tests are unacceptable in FIG. 4.

It was found that the lead-acid batteries which are located on the range of $0.5 \leq X \leq 40$ and $0.5 \leq Y \leq -0.625X+50$ in FIG. 4 have an excellent trickle life performance and favorable charge acceptance characteristics after deep discharge.

It was found that the charge acceptance characteristics after deep discharge in the range of $X<0.5$ and $Y<0.5$ in FIG. 3 are poor. This is because the lead-tin alloy layer was thin or the Sn content in the lead-tin alloy layer was small in the above-mentioned range, which could not sufficiently resolve the problem with the pure lead positive grid, which is inferior in charge acceptance characteristics.

In addition, in the range of $X>50$ and $Y>-0.625 X+50$, the trickle charge characteristics become inferior. This is because in the above-mentioned range, the lead-tin alloy thickness and Sn content were excessive, resulting in development of grain boundary corrosion, which caused a conductive path (non-corrosion section) remaining in the positive grid that causes the trickle life performance to be narrowed.

Accordingly, with respect to the ratio "X" of the lead-tin alloy layer thickness to the total sheet thickness, to improve the trickle life performance and charge acceptance characteristics after deep discharge, it is desirable that the ratio is $0.5 \leq X \leq 40$, or moreover $0.5 \leq X \leq 30$. From the same viewpoints, with respect to the Sn content "Y" per lead-tin alloy layer mass, it is desirable that the content is $0.5 \leq Y \leq -0.625X+50$. In addition, it is most optimal that the X and Y are located in the range of $0.5 \leq X \leq 40$ (moreover, $0.5 \leq X \leq 30$) and $0.5 \leq Y \leq -0.625X+50$.

As mentioned above, by applying a grid, which is produced from a combined sheet obtained by combining a lead-tin alloy plate with a pure lead (99.99 mass % or more) plate and rolling them, to a positive electrode, a valve-regulated lead-acid battery which has excellent trickle life performance without problems in charge acceptance characteristics after deep discharge can be obtained.

In the above-mentioned examples, although a lead-tin alloy containing 0.5 to 50 mass % Sn content is used as a lead-tin alloy, since the existence of tin contributes to the improvement of charge acceptance characteristics after deep discharge, it is preferable to use a lead alloy containing a tin and other metal materials such as a lead-tin-calcium alloy, etc. In this case, it is necessary that the tin content "Y" (mass %) satisfies the formula for $0.5 \leq Y \leq -0.625X+50$.

In the above-mentioned examples, the effect of the cylindrical valve-regulated lead-acid battery according to the invention was described. However, the same effect can be provided with not only a cylindrical valve-regulated lead-acid battery, but also the so-called flooded type lead-acid battery which is supplied similar with a positive plate, because the effect originates from the positive grid.

Moreover, in the above-mentioned examples, although a lead-tin alloy layer is rolled and combined with a layer consisting of a pure lead plate, as the method to provide a lead-tin alloy layer on a surface of a pure lead plate, a chemical vapor deposition method, physical vapor deposition methods, a diffusion penetration method or electrochemical plating methods, etc. can be used. However, in these methods, the method of rolled processing is the simplest, the most economic and excellent in mass production.

Lead-acid batteries which have an excellent trickle life performance and no problems in charge acceptance characteristics after deep discharge are able to be obtained by using a grid obtained by punching or expanding a sheet comprising a lead-tin alloy layer on at least one side of surface of a pure lead plate, and making, in addition, the thickness of lead-tin alloy layer (a ratio of the thickness of the layer to the total sheet thickness) and/or the content of Sn a proper value.

Moreover, a combined sheet obtained by combing a lead-tin alloy plate with a pure lead plate and rolling them can be used for the above-mentioned positive grid. The invention demonstrates an extremely high industrial value because the production method according to the invention is simple and economical, and, moreover, excellent in mass production.

What is claimed is:

1. A lead-acid battery comprising:
   a positive electrode, a negative electrode and a separator lying between said positive electrode and said negative electrode;
   wherein, as a grid of said positive electrode, a grid which is obtained by punching or expanding a sheet comprising a lead-tin alloy layer on only one surface of a pure lead, Pb: 99.99 mass % or more, plate is used.

2. The lead-acid battery according to claim 1, wherein a ratio X % of said lead-tin alloy layer thickness to a total sheet thickness satisfies the formula $0.5 \leq X \leq 40$.

3. The lead-acid battery according to claim 2, wherein a ratio Y mass % of Sn content to lead-tin alloy layer mass satisfies the formula $0.5 \leq Y \leq -0.625X+50$.

4. The lead-acid battery according to claim 1, wherein a ratio X % of said lead-tin alloy layer thickness to a total sheet thickness satisfies the formula $0.5 \leq X \leq 30$.

5. The lead-acid battery according to claim 4, wherein a ratio Y mass % of Sn content to lead-tin alloy layer mass satisfies the formula $0.5 \leq Y \leq -0.625X+50$.

6. The lead-acid battery according to claim 1, wherein a ratio Y mass % of Sn content to said lead-tin alloy layer mass and a ratio X % of a lead-tin alloy layer thickness to a total sheet thickness satisfy the formula $0.5 \leq Y \leq -0.625X+50$.

7. The lead-acid battery according to claim 1, wherein said lead-tin alloy layer is combined into a layer comprising said pure lead plate by a rolling process.

8. The lead-acid battery according to claim 1, wherein said grid has a positive active material thereon.

* * * * *